(No Model.)
S. C. ARNOLD.
STABLE SCRAPER.
No. 320,112. Patented June 16, 1885.
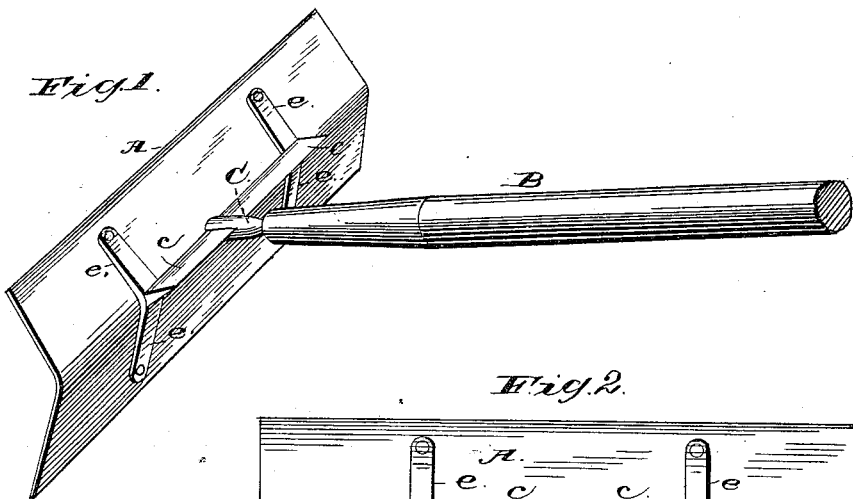
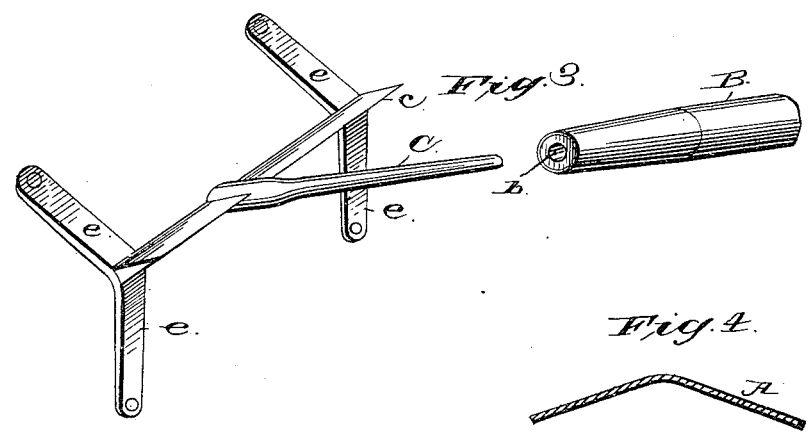
WITNESSES
S. C. Arnold
INVENTOR
by C. A. Snow & Co.
Attorneys

UNITED STATES PATENT OFFICE.

SAMUEL C. ARNOLD, OF WEST LEBANON, NEW HAMPSHIRE.

STABLE-SCRAPER.

SPECIFICATION forming part of Letters Patent No. 320,112, dated June 16, 1885.

Application filed January 16, 1885. (No model.)

*To all whom it may concern:*

Be it known that I, SAMUEL C. ARNOLD, a citizen of the United States, residing at West Lebanon, in the county of Grafton and State of New Hampshire, have invented a new and useful Improvement in Stable-Scrapers, of which the following is a specification, reference being had to the accompanying drawings.

My invention relates to a scraper for removing manure, &c., from stables; and it has for its object to provide a device of this character which shall be cheap and simple in its construction, effective in its operation, and light and durable. With these ends in view the invention consists in the improved construction of scraper, and in the means for attaching the same to a handle, as will be hereinafter fully described, and pointed out in the claim.

In the drawings, Figure 1 is a perspective view of a scraper constructed in accordance with my invention. Fig. 2 is a top view of the same. Fig. 3 is a detail view of the securing means detached. Fig. 4 is a cross-section showing the form of scraping-blade employed, and Figs. 5 and 6 are cross sections of modified forms of blades.

In the accompanying drawings, in which like letters of reference indicate corresponding parts in all the figures, A represents the blade or plate of my improved scraper, which, as shown in Figs. 1, 5, and 6, may be either a plane, or circular, or what might be termed "extended V shape" in cross-section. The said blade or plate A is preferably of a heavy quality of sheet-iron, and is bent to the desired form.

B represents the handle, which is formed at its lower end with an extended recess or opening, *b*, to receive the shank C of the blade-support. A collar or sleeve incloses the lower end of the handle, acting as a ferrule to prevent the handle from slipping when the device is in use.

The shank C has an arm, *c*, secured midway its ends and at right angles thereto, which arm *c* is provided at its ends with arms *e*, formed integral therewith or secured thereto, said arms *e* being bent to conform to the shape of the blade A, and secured thereto by rivets or equivalent fastening means. The arm or plate *c* is thicker at its lower than at its upper end, thus forming a scraping-surface.

In use the blade is pushed along the floor, and thus gathers the manure in a pile, and the plate *c* is employed as a means of ridding the shoes of any manure, &c., that may have adhered thereto by scraping the shoes upon the same, said plate or arm forming very effective means for this purpose. In addition to this, it serves to effectually brace the scraping plate or blade and prevent the same from being bent transversely.

The arms at the ends of the plate or arm *c*, in addition to serving as attaching means, prevent the blade or plate from bending longitudinally.

The above-described device is cheap and simple in its construction, effective in its operation, and strong and durable, at the same time light and readily handled.

Having fully described my invention, what I claim as new, and desire to secure by Letters Patent, is—

The scraping device herein described, consisting of a handle, a shank fitted thereon, an arm, *c*, having a scraping-edge on said shank, arms *e*, secured to the ends of the arm *c*, and a blade secured to the arms *e*, said arms *e* and the blade being of an extended V shape, substantially as set forth.

In testimony that I claim the foregoing as my own I have hereto affixed my signature in presence of two witnesses.

SAMUEL C. ARNOLD.

Witnesses:
EDWARD J. DURANT,
CHARLES A. DOWNS.